Jan. 8, 1952     S. M. DOWDELL ET AL     2,582,193
QUICK-ATTACHING TRACTION DEVICE

Filed Oct. 20, 1950     3 Sheets-Sheet 1

Sidney M Dowdell
Italo L. Giovanella
Inventors
by James R. Hodder
Attorney

Jan. 8, 1952 S. M. DOWDELL ET AL 2,582,193
QUICK-ATTACHING TRACTION DEVICE
Filed Oct. 20, 1950 3 Sheets-Sheet 2
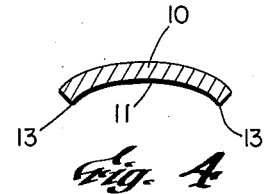
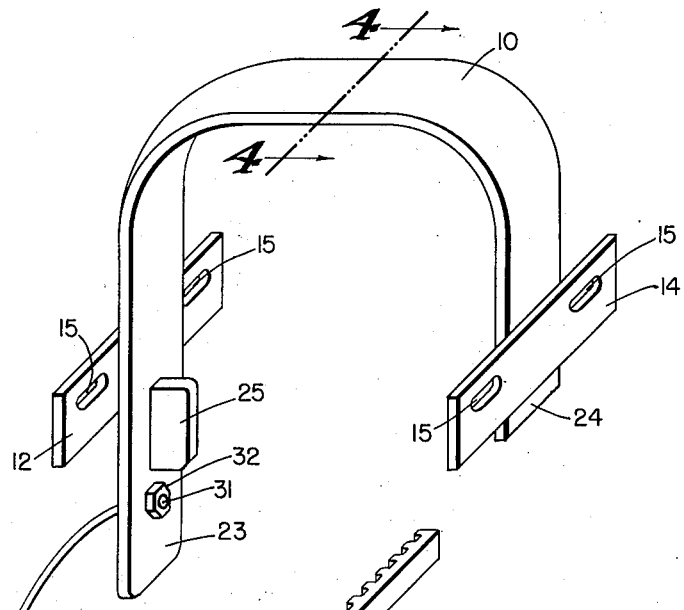
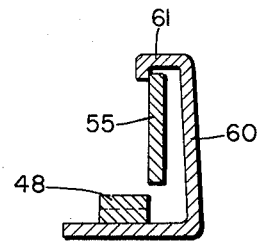
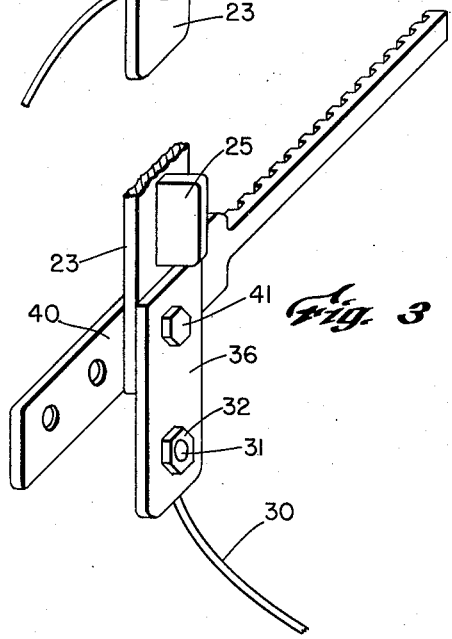

Jan. 8, 1952 S. M. DOWDELL ET AL 2,582,193
QUICK-ATTACHING TRACTION DEVICE
Filed Oct. 20, 1950 3 Sheets-Sheet 3
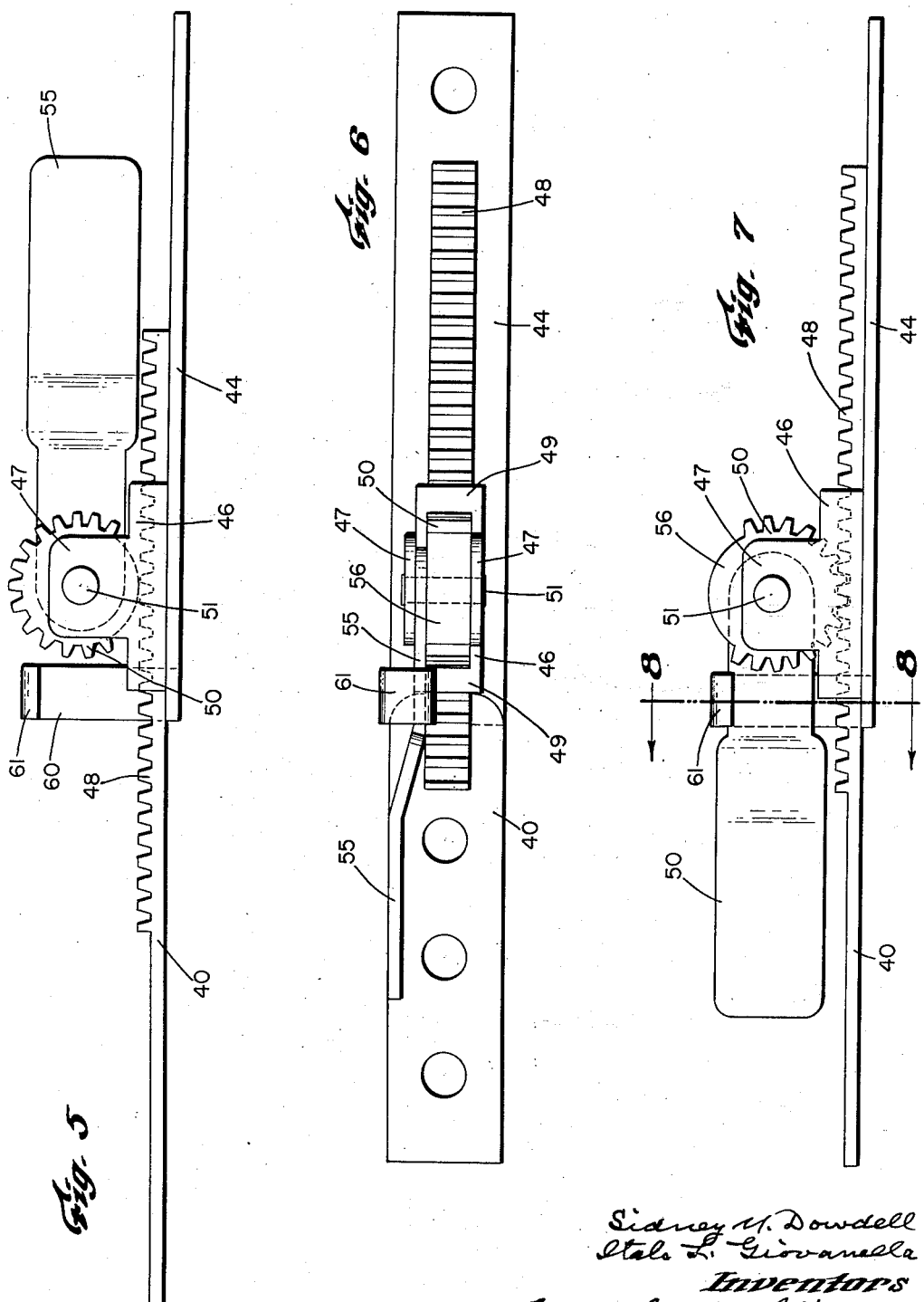

UNITED STATES PATENT OFFICE 2,582,193

QUICK-ATTACHING TRACTION DEVICE

Sidney M. Dowdell, Natick, and Italo L. Giovanella, Dover, Mass., assignors of one-third to Eva L. Salisbury, Madison, N. J., and D. C. Steele, Basking Ridge, N. J.

Application October 20, 1950, Serial No. 191,202

2 Claims. (Cl. 152—223)

Our present invention relates to traction devices for use on automobile wheels, and is directed to improve and perfect the type of traction devices shown and described in our prior application Ser. No. 31,683, filed June 8, 1948.

As explained in our said prior application, we have developed a traction device which can be quickly attached to and removed from an automobile wheel operating entirely from one side, viz., outside of the wheel, and thus eliminate the necessity of jacking up the vehicle or rolling the same back and forth over the usual type of tire chains now in vogue.

In carrying out our invention, we utilize a plurality of strong, flat hook members which extend across the tread surface of the top and which members carry a pair of traction elements, such as chains, at each side of each of the hook members, these chains taking up the wear and supplying the traction desired in ice, snow, mud, sand, and other adverse road travel conditions.

We also have arranged a flexible connection between the several hook members and their attached pairs of cross-chains so that the entire device can be readily folded or nested into a small compact space for convenience in carrying or storing.

An important improved feature in our present development of the quick-attaching tire traction devices is the arrangement and construction of our means for automatically adjusting the clamping action of each hook on the tread surface of the tire simultaneously by a quickly adjustable locking device which is also simultaneously locked in position.

A further feature of our locking element consists in the range of tire adjustment permitted while still enabling the lock to exert desired tension on the hook members even though the tire to which the hooks are applied may be of varying diameters. Thus, our lock affords an automatic fitting of the device within a considerable range of differing diameters and yet secures the same locking tension and effective by the simple operation of swinging a lever to secure the clamping action of the hooks on the tire.

A further feature consists in our design and construction of the hook members which provide for an impinging and firm clamping action on the tread surface of the tire to which they are applied, as well also as constituting a strong and rigid construction in a thin flat metal, viz. by arching the metal widthwise, which thus greatly increases the strength and stiffness of the flat hook as well as holding it firmly in position on the tread surface of the yielding tire. This feature is very important and constitutes a great improvement over prior efforts to utilize hook elements as friction-creating devices.

A still further feature consists in the positions, dimensions, and proportions of the cross-link or traction elements which are spaced sufficiently each side of the flat hooks so as to allow these elements a considerable degree of rolling or sliding movement without disturbing or disaligning the position of the hook members on the tread of the tire.

This feature is of vital importance as when the cross-chain is on the bottom of the tire and impinged between the tire and the road surface, it is held stationary relatively with the wheel while the wheel and vehicle are moving and, therefore, the cross-link must have provision for momentary stopping while the vehicle moves on. Thus, the cross-links operate without undue strain or retarding of the vehicle or the roll of the wheel.

A still further feature which constitutes an important improvement over the construction shown in our prior application is that we have discovered means to prevent the hook members from rocking on the tire which tended to loosen the holding action on the extreme end of the hook to which the cross-links are attached.

In prior devices of this general type it was difficult, if not impossible, to hold the inner end of the hook with sufficient rigidity to be a practical traction element. We have discovered that by providing a bearing or leverage element which contacted the rigid rim of the wheel to which the hook is attached, the outer end of the hook would be thus held firmly in position and this feature, in combination with the arc-shaped widthwise form of the hook itself, which gives added strength to the outermost end as well as clamping permanence on the surface of the tire, we have devised as the present improved form of our apparatus.

Further improvements, advantages, and details of construction will be hereinafter more fully pointed out and claimed.

Referring to the drawings illustrating a preferred embodiment of our present invention:

Fig. 2 is an enlarged perspective view of the hook member;

Fig. 3 is an enlarged fragmentary view in perspective of a part of the clamping device.

Fig. 4 is an enlarged cross-sectional view of the hook member showing the arc-shaped widthwise form for strength and tire-clamping action;

Fig. 5 is an enlarged side elevational view of our clamp in open or unlocked position;

Fig. 6 is a top plan view of same;

Fig. 7 is a side view showing the clamp in locked position; and

Fig. 8 is a cross-sectional view on the line 8—8 of Fig. 7.

Figure 1:
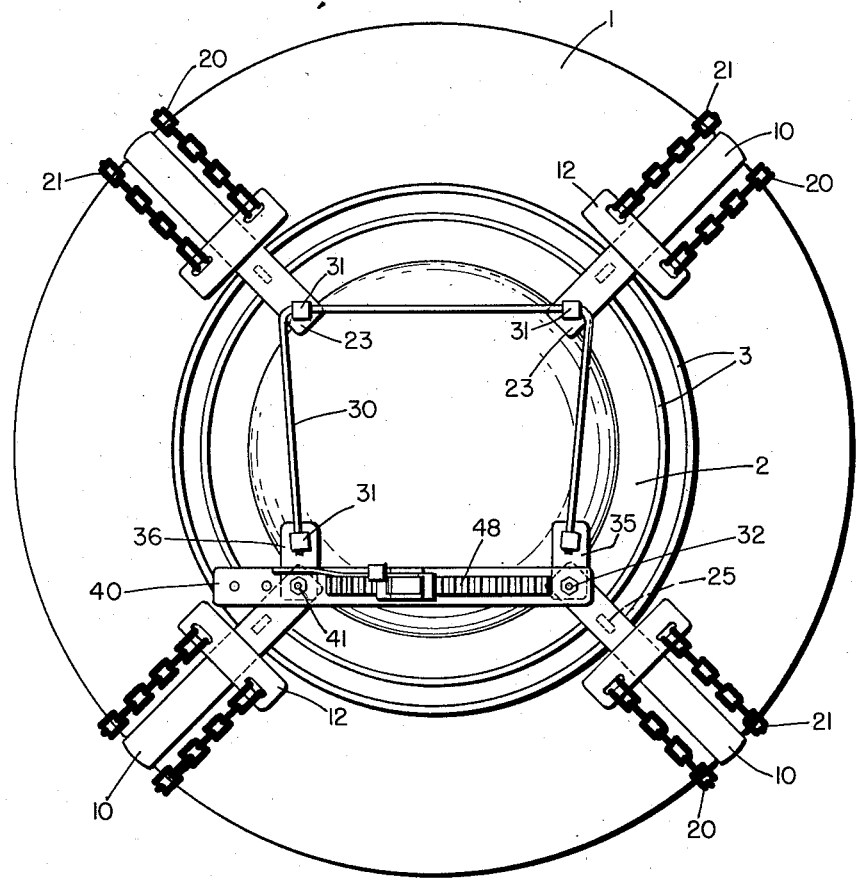
Fig. 1 is a view of our improved device and attached wheel, viewing the same from the outside of the vehicle.

Referring to the drawings, a pneumatic vehicle wheel is indicated at 1, mounted on a metallic wheel 2 having the usual rim, or rims, 3 holding the tire and to which our improved traction device is to be applied from one side, viz., the outer and easily accessible surface of the wheel, while the vehicle is at rest.

We preferably utilize four clamping hooks although any plurality may be employed, such for example as the six hooks shown in our prior application. These hooks are flexibly united, as will be explained, and are adjustably secured by our improved novel type of clamp and locking device. Each hook comprises a flat arched member 10 of suitable length to extend over the tread surface of the tire and downwardly on the opposite or inside portion. These hook-carrying crosspieces 12 and 14, as best shown in Fig. 2, are crossmembers with slots 15—15 to which the traction links 20 and 21 are attached adjacent each clamp. The hook 10 is preferably curved widthwise, as shown in Fig. 4, having a convex surface 11 and with the side edges 13—13 adapted to impinge slightly into the surface of the tire when the hooks are drawn into compressive clamped position. This construction thus not only strengthens the hook but also firmly imbeds it in the tire.

As the cross-links 20 and 21 are of considerably greater diameter than that of the thin metal of the hook 10, it will be appreciated that the hook 10 is held free of contact with the rod surface and, hence, it is protected from wear and is protected also from being displaced laterally of the tread surface of the tire because the links 20 and 21 may roll or move freely between the crosspieces 12 and 14 to which their respective ends are attached.

The hook 10 has preferably a longer arm 23 carrying the cross-pieces 12; whereas the opposite and shorter end 24 extending over the tire and on the inner side carries the cross-piece 14. To the longer arm 23 we attach a bearing block 25 attached and constructed to contact against a metal of the rim, preferably on one or both of the parts 3 of the tire rim, this block 25 constituting a leverage member to hold the outer end 24 of the hook 10 in close contacting position on the inner side and, hence, also to stiffen the outer end of the hook carrying the cross-piece 14 and the attached pair of traction chains.

This is a most important feature and insures the firm gripping of the hook on, over, and about the tire and prevents the hook from being displaced or jumping off during severe road and strain conditions as when our device is applied to heavy trucks, busses, vehicles, or the like.

Each hook is formed as above described, and these are united by a flexible element, preferably a wire 30 as shown herein, although we could utilize the sets of pivoted links illustrated in our prior application if desired. This attaching wire 30 can be secured to the lower end portion 23 of each of the hooks in any suitable manner, but preferably we employ a so-called Edison locking bolt 31 thru which the wire 30 passes and which is held in locked position by a nut 32 on the inner end of the bolt, as shown in Fig. 2, which Edison bolts are threaded directly thru the shanks of a pair of the hooks, where four are used as herein illustrated, but are attached to short links 35 and 36, which links, in turn, are pivotally secured to the inner end portions 23 of the other pair of hooks to which our locking device is attached.

These links 35 and 36 are most important in permitting the self-seating and self-adjusting action of the device about the wheel tire when the locking clamp is operated.

The locking clamp will now be described. This clamp is best shown in Figs. 5, 6, and 7, wherein a rack bar 40 is bolted, as shown at 41, to the link 36, which bolt secures the link to the adjacent hook and cooperates with a bar 44 attached to the link 35 by a bolt 32, which also secures the link 35 to its adjacent hook. Formed on the bar 44 is a trough 46 constituting a slide for the rack teeth 48 on the rack bar 40, said trough 46 having upstanding sides 47—47 to constitute a bearing for a pinion 50 mounted on an axle 41 extending between the parts 47. Preferably, also, we unite the edge portions on the trough members 46 by cross-pieces 49 under which the rack teeth 48 will slide.

An operating lever 55 is welded or otherwise secured to the pinion 50 so that movement of the lever 55 will rotate the pinion 50. This pinion has teeth adapted to mesh with the rack bar teeth 48 but with an interrupted segment 56 so that with the handle moved to the right, viewing Fig. 5, the interrupted section 56 will permit the rack teeth 48 to slide freely thereunder and allow the bar 40 to be entirely withdrawn from the trough 46. Consequently, when the two upper hooks 10 and attached pairs of cross-chains 20 and 21 are hung on top of the tire, the two bottom hooks can be roughly adjusted to the tire—in fact, hanging in appropriate position to be hooked about the tread surface of a tire with the bars 40 and 44 separated.

Whereupon, the teeth 48 of the bar 40 are threaded thru the trough 46 and underneath the interrupted segment 56 in the pinion until the hooks 10 are in contact with and approximately adjusted on the surface of the tire. This gives a large range of adjustment of the four hooks and their attached traction chains, allowing for a considerable range of fit automatically of the device about tires of different diameters.

With the bars 40 and 44 thus overlapped with the teeth 48 in position under the interrupted segment in the pinion 50, the lever 55 is then moved to the left, viewing Figs. 6 and 7; whereupon the teeth in the pinion 50 engage the teeth 48 in the bar 40 at whatever point is in contact, and continued rotary movement of the lever 55 draws the bars 40 and 44 together and, consequently, the entire set of hooks are clamped rigidly, automatically, instantly, and with self-adjusting tension in firm engagement with the tire.

To hold the handle 55 thus in position, we provide a spring lock or catch 60 secured firmly to the bar 44 and extending upwardly in appropriate position with the hooked portion 61 adapted to snap over the lever 55 and thus hold it in locked position, as shown, in Figs. 6, 7 and 8.

To unlock the device for removal, the hook portion 61 is simply sprung backwardly and the lever 59 raised and moved to the right, thus freeing the teeth 48 and the bar 40 from the teeth in the pinion 50 and permitting separation and removal of the bars 40 and 44, which automatically releases the four hooks and permits their quick removal.

We claim:

1. An automobile tire traction apparatus of the kind described, constructed and arranged to be attached to a tire from one side only, comprising a plurality of hook-like members extending over the tread surface of the tire, said hook members having a longer arm to contact the outside of the tire, and a shorter arm in contact with the inner side of the tire, the members being arc-shaped widthwise, flexible means connecting the longer arms of said plurality of members, each hook having a cross-piece adjacent the end of the shorter arm and a corresponding cross-piece on the longer arm adjacent said flexible connecting means, traction elements attached to said cross-pieces at each side of each of said hook members, and being of greater thickness than said members constituting protection for the hook members from wear, said traction elements being free to move independently of the hook members, in combination with clamping means to automatically clamp all the hook members onto the tire tread and lock the same in clamped position, said clamping means comprising a pair of interlocking bars, one carrying a rack and the other a pinion engaging said rack, and means to rotate the pinion to tighten all the hooks simultaneously about the tire.

2. A construction as set forth in claim 1, in combination with means to lock the rack and pinion in clamping relation.

SIDNEY M. DOWDELL.
ITALO L. GIOVANELLA.

REFERENCES CITED

The following references are of record in the file of this patent:

UNITED STATES PATENTS

| Number | Name | Date |
|---|---|---|
| 1,769,307 | Price | July 1, 1930 |
| 2,503,399 | Maas | Apr. 11, 1950 |
| 2,507,037 | Miller | May 9, 1950 |